US011115787B1

(12) United States Patent
Løken

(10) Patent No.: US 11,115,787 B1
(45) Date of Patent: Sep. 7, 2021

(54) METHOD AND SYSTEM FOR ASSIGNING OWNERSHIP OF A MARKED PHYSICAL ITEM INVOLVING TRACK AND TRACE

(71) Applicant: KEZZLER AS, Oslo (NO)

(72) Inventor: Magnar Løken, Oslo (NO)

(73) Assignee: KEZZLER AS, Oslo (NO)

( * ) Notice: Subject to any disclaimer, the term of this patent is extended or adjusted under 35 U.S.C. 154(b) by 0 days.

(21) Appl. No.: 16/886,393

(22) Filed: May 28, 2020

(30) Foreign Application Priority Data

Feb. 26, 2020 (NO) .................................. 20200235
Apr. 16, 2020 (NO) .................................. 20200464

(51) Int. Cl.
| | |
|---|---|
| *G06Q 10/00* | (2012.01) |
| *H04W 4/35* | (2018.01) |
| *G06Q 10/08* | (2012.01) |
| *G06Q 30/06* | (2012.01) |
| *G06Q 20/32* | (2012.01) |
| *H04W 4/021* | (2018.01) |

(52) U.S. Cl.
CPC ............ *H04W 4/35* (2018.02); *G06Q 10/087* (2013.01); *G06Q 10/0833* (2013.01); *G06Q 20/3276* (2013.01); *G06Q 30/0641* (2013.01); *H04W 4/021* (2013.01)

(58) Field of Classification Search
CPC .... H04W 4/35; H04W 4/021; G06Q 10/0833; G06Q 10/087; G06Q 20/3276; G06Q 30/0641

USPC ........................................................ 235/385
See application file for complete search history.

(56) References Cited

U.S. PATENT DOCUMENTS

| | | | |
|---|---|---|---|
| 2015/0019355 A1 | 1/2015 | Russell et al. | |
| 2016/0055474 A1 | 2/2016 | Syed | |
| 2016/0300184 A1 | 10/2016 | Zamer et al. | |
| 2017/0046707 A1* | 2/2017 | Krause | G06Q 20/4016 |
| 2017/0083887 A1* | 3/2017 | Volta | G06Q 20/208 |
| 2019/0125106 A1* | 5/2019 | Bode | G06K 7/10445 |
| 2020/0012999 A1* | 1/2020 | Kang | G06Q 30/0639 |

OTHER PUBLICATIONS

Norwegian Search Report for Norwegian Application No. 20200235, dated Sep. 24, 2020, with English translation.

* cited by examiner

*Primary Examiner* — Daniel A Hess
(74) *Attorney, Agent, or Firm* — Birch, Stewart, Kolasch & Birch, LLP

(57) ABSTRACT

A code attribution control system includes unique codes. Each code is arranged or marked openly accessible legible or scannable on a sales item. One or more of the sales items is openly and freely displayed and for sale within a physical border of a physical shop. The item initially is allocated a status code attribute as "not sold" in said attribution control system, wherein for a consumer to establish ownership or indication of ownership of the item, the consumer scans and registers the code outside the border of the shop. The status code attribute is changed to "sold" in the attribution control system, after which owner restricted services related to the item will be made available to the consumer.

26 Claims, 7 Drawing Sheets

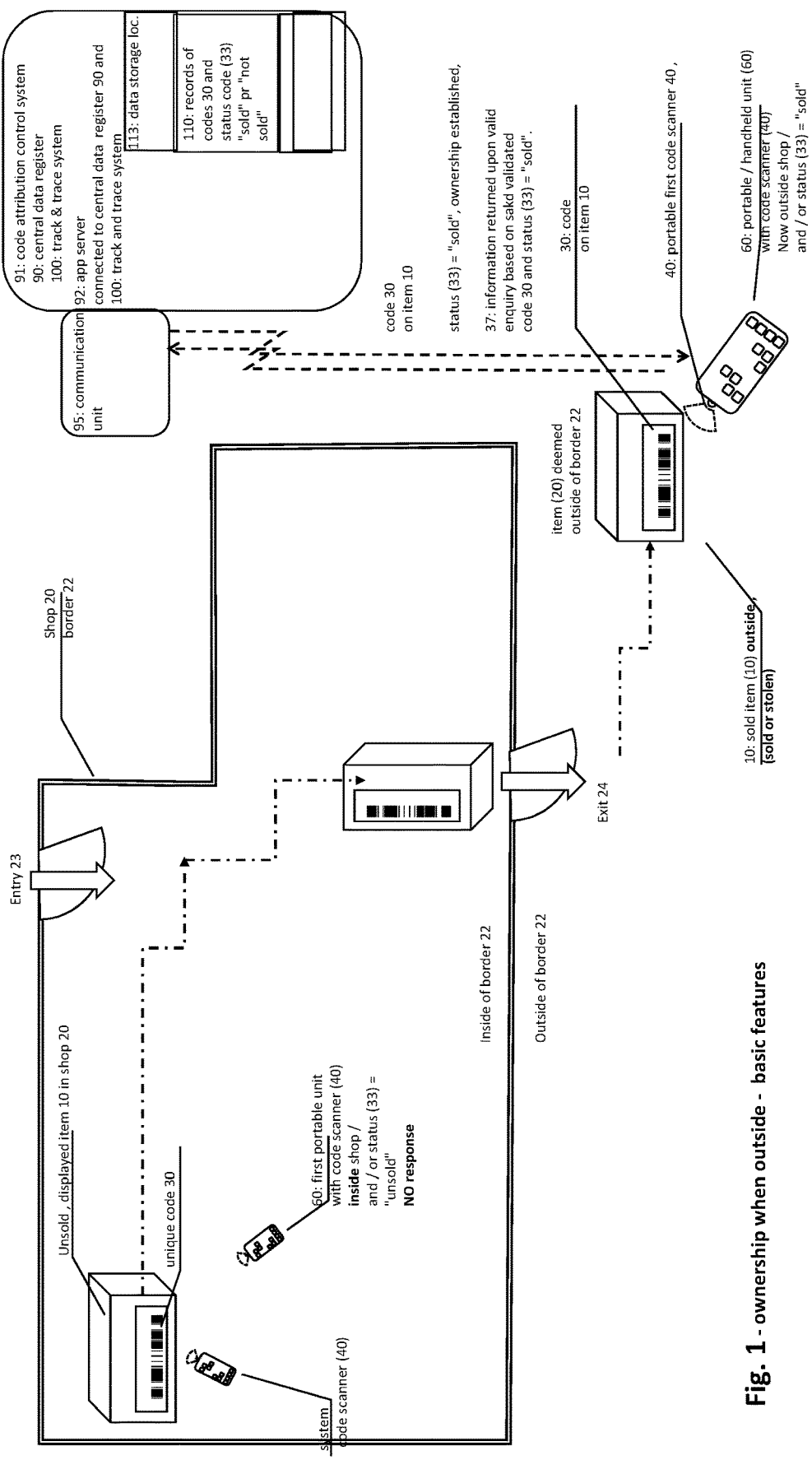
Fig. 1 - ownership when outside - basic features

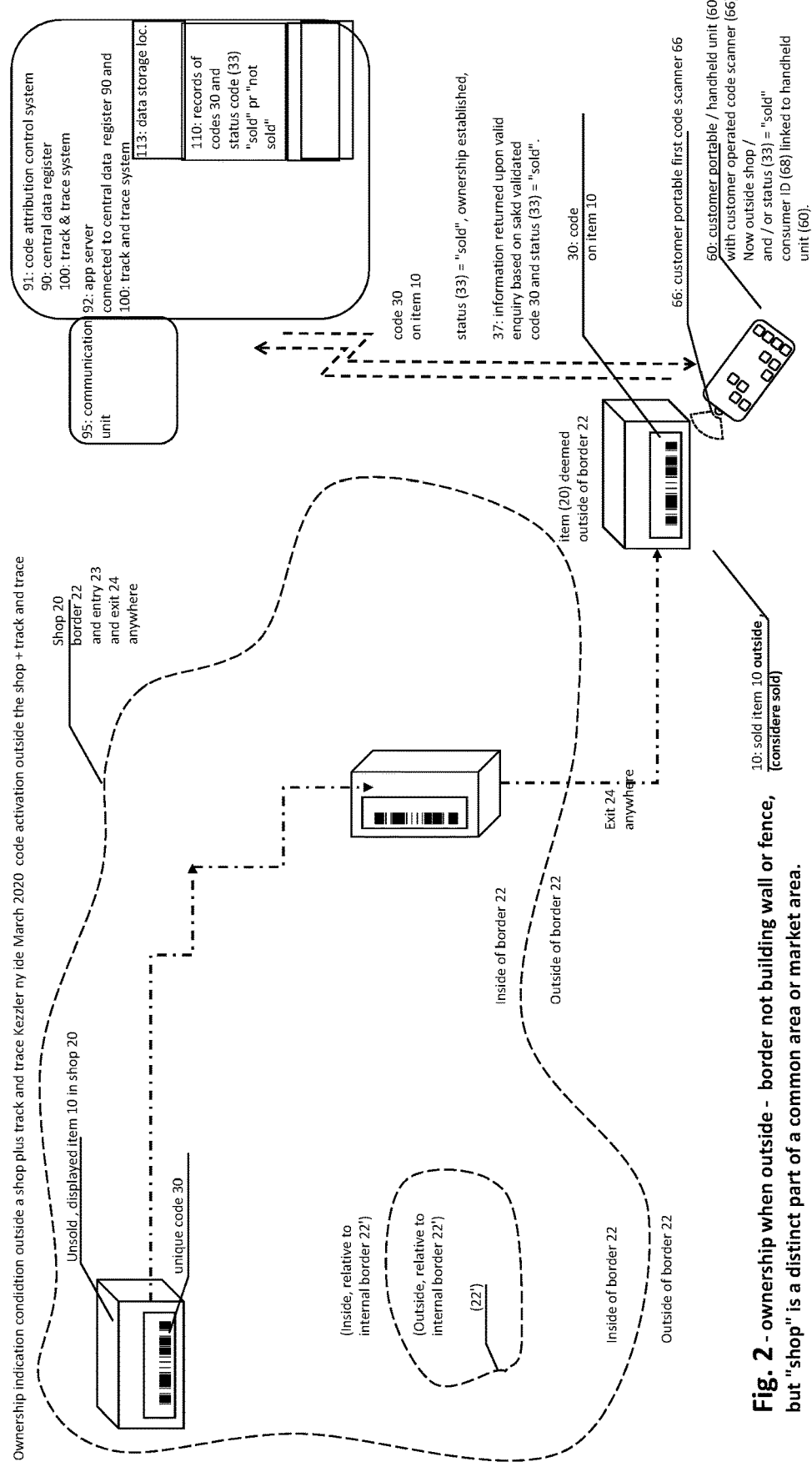
Fig. 2 - ownership when outside - border not building wall or fence, but "shop" is a distinct part of a common area or market area.

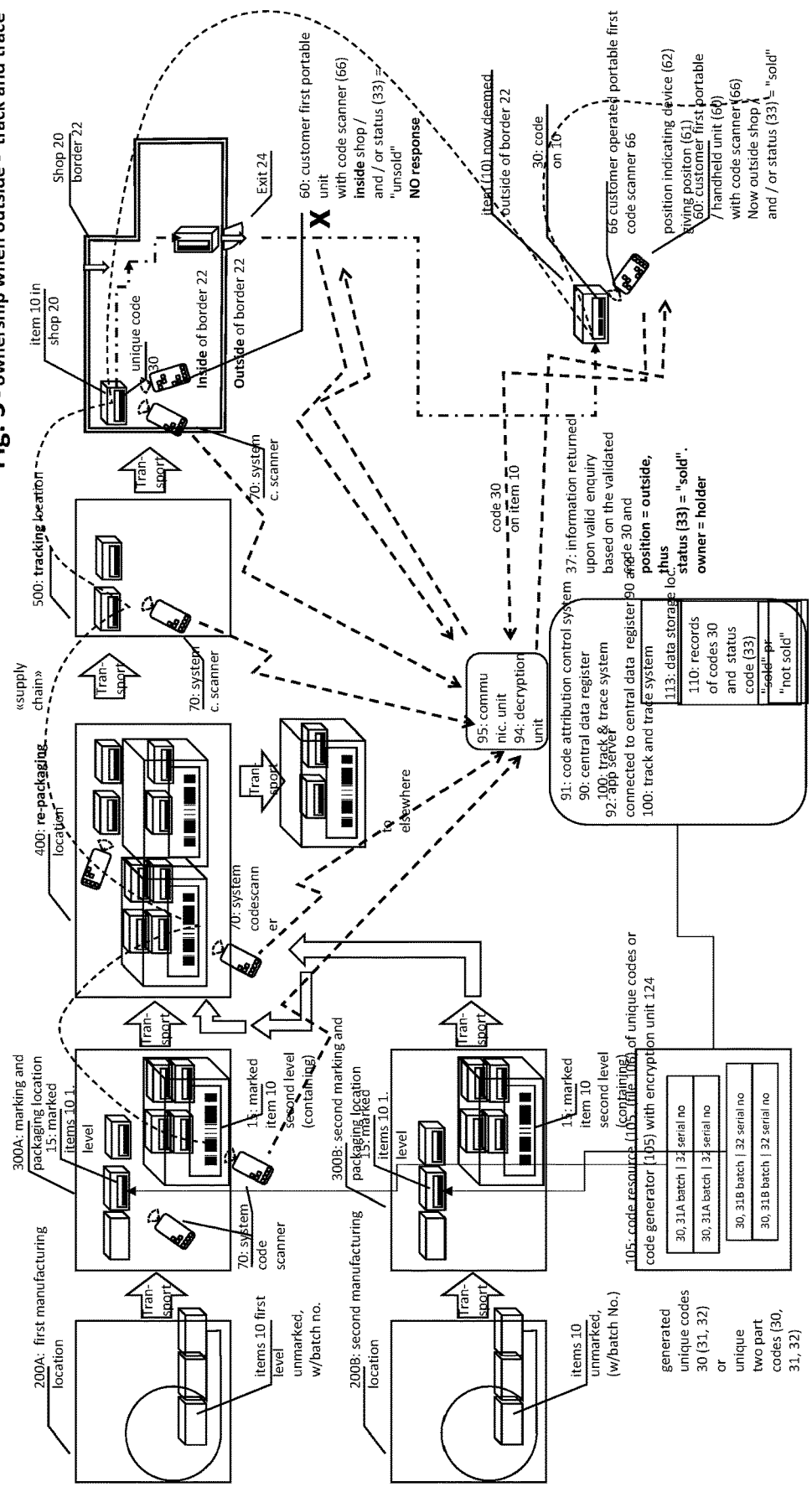
Fig. 3 - ownership when outside - track and trace

Fig. 4 - hierarchical packaging relations and hierarchical code relations

In an advantageous embodiment of the invention, all levels of items (10, 10', 10'', 10''', 10'''', ...) are marked with same type of code (30)

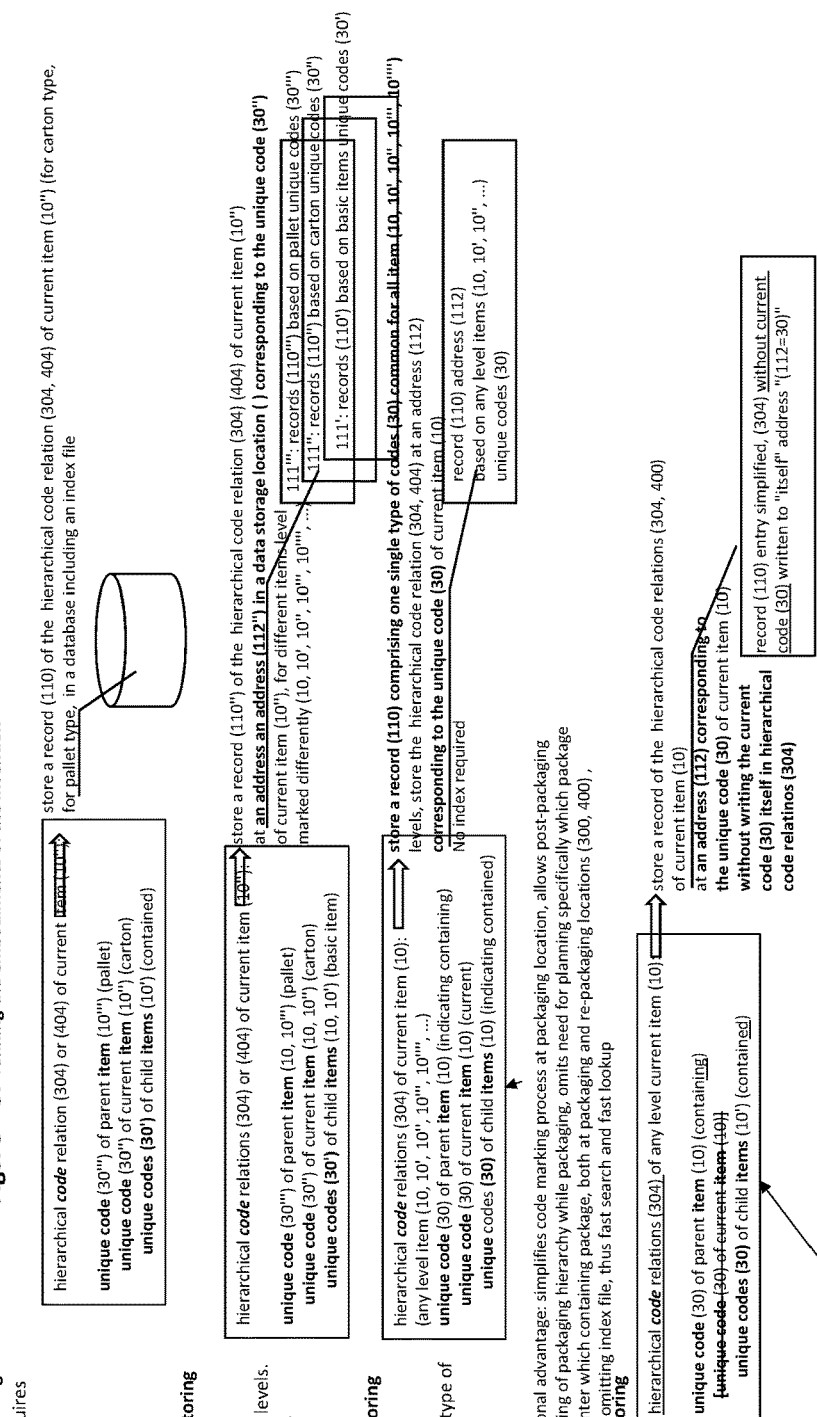

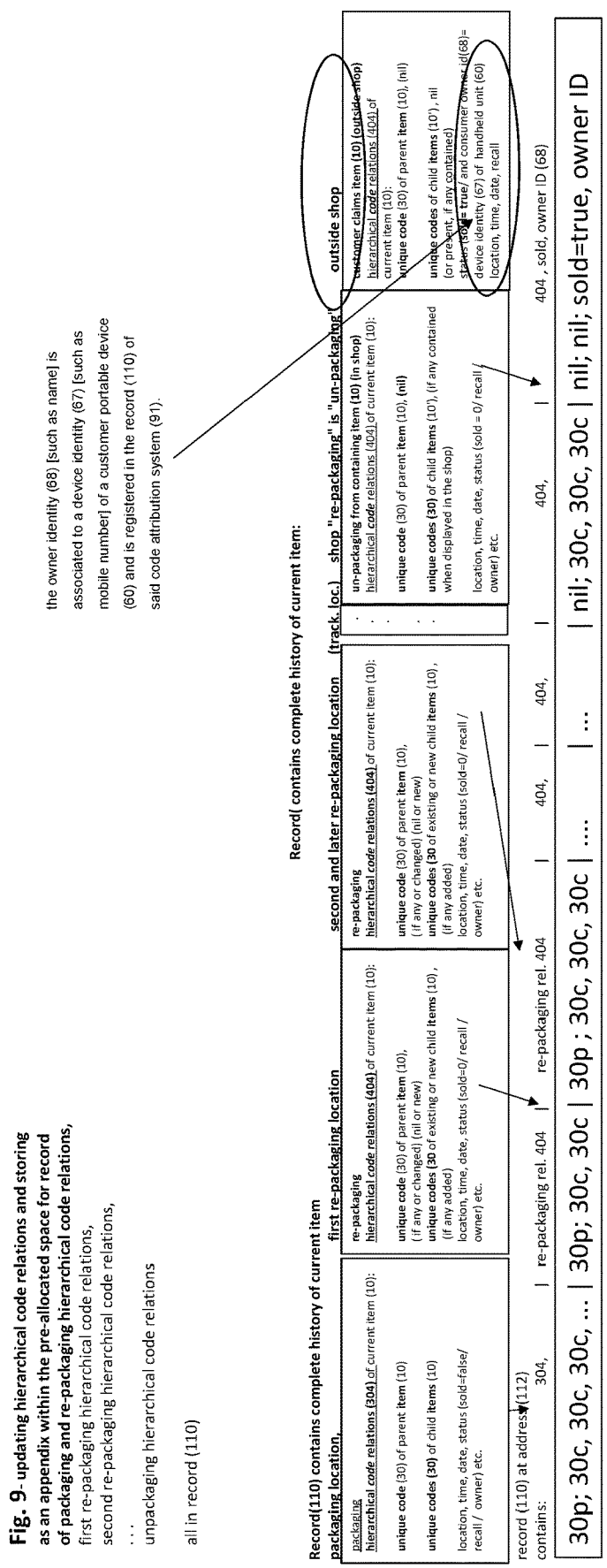

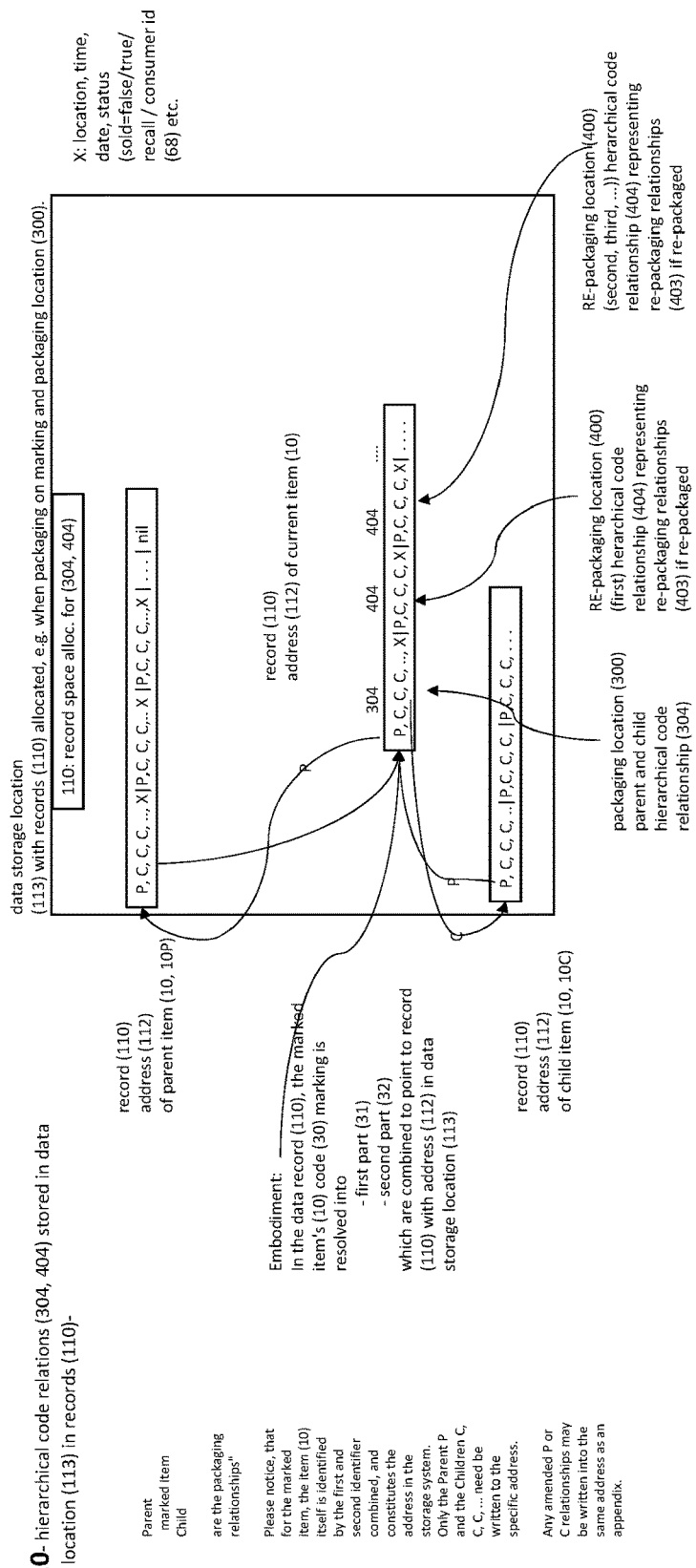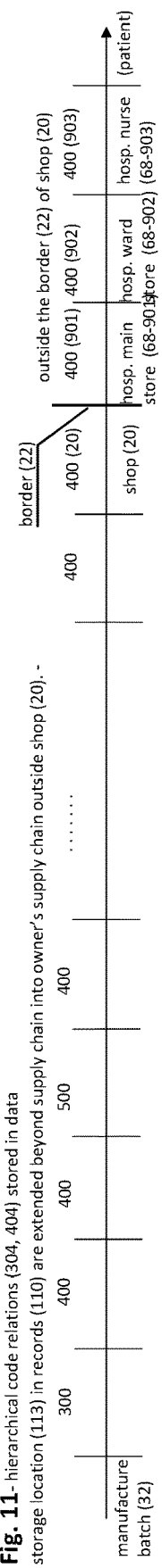

METHOD AND SYSTEM FOR ASSIGNING OWNERSHIP OF A MARKED PHYSICAL ITEM INVOLVING TRACK AND TRACE

INTRODUCTION

The present invention is a code attribution activation system for unique codes of sales items. The codes are arranged as legible codes on items in a shop. The code itself may be legible for the potential buyer in the shop.

Introduction and Problem

For an item provided with a unique code and being for sale displayed or stocked in a shop or other publicly accessible sales location, the unique code carries potential services and benefits (S), wherein said services and benefits (S) are unlocked by the code itself. These services and benefits (S) should only be available to the owner. When an item that is freely displayed within a physical shop, and the code on the item is possible to scan while the item is in the shop, at display such as on a shelf or in a shop storage area, the consumer could simply scan the code (30) and get access to the services and benefits (S) that should only become available to the bearer of the product, after obtaining a proof of purchase or otherwise indication of ownership. If such undesired scanning of the code can take place by anybody visiting the shop, the subsequent proper owner would be denied his appropriate services and benefits (S). Unless such undesired scanning is controlled and managed, in a physical shop, the scanning of codes is hard to avoid. These problems are solved by the current invention.

A non-exhaustive list of examples of such services and benefits (S) may be given by the following, reserved for the actual owner:
- discount coupon codes for being used for additional purchases, or purchases of further items units, or giving access to other services.
- a guarantee certificate for the bought item,
- accessing user instructions for the bought item,
- participation in general loyalty schemes and programs, and the like
- unique information or services related or associated to the unique item, such as a pin code for the product. only.

Further, a common practice has been to place a code as a label or print directly on the product package's surface and legible for all. A person who uses the code, e.g. for identifying a discount coupon code, without actually buying the product, actually steals the discount. He may then, when being inside the shop, enter the code, e.g. on an interactive internet page, for abusing the discount coupon code thus obtaining a discount on other goods from the same manufacturer or the same shop. One practical way for the manufacturer of the product is to place the code inside the product packaging, in the form of an internally placed label tag, or an internal print at the rear of the carton, but this requires at least one more labeling and packaging step, and adds undesired cost. These problems are also solved by the current invention.

Solution to the Problem

The present invention is defined in the attached claims, and presents a solution to one or more of the stated problems.

Advantages of the Invention

A first advantage of the present invention is that one avoids codes and benefits being abused by non-owners in the shop, when the code is openly marked on the product. In the background art a very common solution is to protect and hide the code out of view, by e.g. scratch-panels, double layering, or arranging the code inside packaged labels or within the packaging itself. It is not uncommon for consumers in a shop to tamper with such hidden codes by destroying the code protection, or the container, without being owners, and by such making the product non-sellable. The invention conserves brand integrity and package integrity. Due to the fact that a value is linked to the item by the code, the background art practice creates a temptation and an opportunity for some persons to tamper with the product's integrity.

A second advantage of the present invention related to the first problem, in the background art the cost of protecting the code on the item from tampering is very high, and in practical terms, inhibitive in a price-sensitive market. Marking items (10) with directly legible unique codes (30) according to the present invention that may also be used for providing services and benefits (S) restricted to the actual owner of the product, is cost saving and serves the interest of the proper owner.

One way of protecting the value and a code, if the code is freely presented while being inside the shop, is to provide the consumer with some type of proof of purchase in the shop itself that releases the value (other services and benefits) to the now registered owner. In this case some kind of system operated by the shop, an electronic cash register, typically, would have to be interacted by both the shop and then by the consumer to register the ownership based on the unique code of the item. However it is evident that this is a rather cumbersome and expensive method that would incur undesired scans, so in practice this is less feasible. The present invention solves these problems.

So a third advantage by the present invention, considering the above, is that it will be possible and easy to have freely and open unique codes (30) on items (10) in the shop (20), wherein said unique codes (30) are associated with owner restricted services and benefits (S), without the need for having registering the ownership by the shop or the shop operator to control and avoid undesired code scans and abuse of those.

In other words, the present invention makes it possible to freely present open unique codes (30) within the shop (20) area as described above, for the purpose of conveying owner services and benefits (S), without the need for systems for proof of purchase within the shop or an electronic cash register in the shop, and assignment of ownership as described above, such as a system for administration or intervention or interaction within the shop area or by the shop assistants.

A fourth advantage of the present invention is that due to the fact that the unique codes (30) are arranged for being freely displayed on the items (10), and not for being hidden out of direct sight in any way, the unique code (30) may still be scanned in the shop by non-owners for the potential buyer to obtain both general and item specific information, such as price, requirements for use, recommended accompanying products, etc. This would not be feasible if the code was hidden.

It is important to note related to the above, that this requires really unique codes (30) on the items. The uniqueness of the unique code (30), when scanning in the shop within the shop border (22) as a non-owner, might be used to inform the potential buyer about such item related information as recall status that is definitely related to an individual item. This important service and feature is not possible if the code is hidden and not accessible without unallowed tampering on the product. With serialization, only parts of a batch might be recalled, whereby the need to identify on an individual basis arises, which is made feasible by the present invention. Another situation is where the shop operator (or brand owner) allows the consumer freely to see some selected track and trace information, being unique for each item, without being the owner of the item. A comprehensive or complete track and trace record display for a uniquely coded (30) item (10) might be reserved for the brand owner or the owner of the item (10).

BRIEF FIGURE CAPTIONS

FIG. 1 is an overview of the basic features related to the invention. In FIG. 1 we have illustrated an outline plan of a shop (20) such as a building, with walls representing a border (22) of the shop (20), and having an entry (23) and an exit (24). Unique code (30) marked items (10) are displayed for sale within the border (22). A user scans the code (30) while being outside the border (22), and acquires ownership of the code (30) marked item (10) and is assigned owner restricted services (s) to the item (10).

FIG. 2 illustrates an alternative embodiment of the invention, wherein the border (22) may be not materially present absent, but still defined, or divided into several connected or not interconnected sub-areas, or even "void" areas defining "outside" the border (22), such as an otherwise unrelated cafe arranged as an "island" within a shop.

FIG. 3 illustrates an embodiment of the invention wherein the shop (20) forms part of a track and trace system (100) comprising one or more marking and packaging locations (300, 300A, 300B, ...) wherein unmarked items (10) are provided with each their unique code (30) as they are packed in a physical packaging hierarchy (303), and transport routes to one or more re-packaging and logistical distribution locations (400) wherein physical re-packaging into a physical re-packaging hierarchy (403) of the code marked (30) items (10) may occur, and further transport via one or more tracking locations (500) or re-packaging locations (400), eventually to a shop (20) wherein the marked (30) item (10) is displayed or otherwise available for sale. A tracking location (500) may be regarded as a re-packaging locating (400 with the exception that just a scanning of a code (30) marked item (10) occurs while passing through the tracking location (500)

FIG. 4—illustrates an embodiment of the invention wherein hierarchical packaging relations (303) are made at several levels, and some related hierarchical code relations (304) at defined at the different levels. Here is shown hierarchical packaging relations (303) between code (30, 30') marked first level items (10'), which are packed into code (30, 30") marked second level items (10"), such as boxes. A number of such boxes, second level items (10") are placed in or on larger third level items (10''') such as pallets, and such pallets, third level items (10''') may be placed in shipping containers which here are called fourth level items (10''''). Those hierarchical "physical" (material) packaging relations (303) are registered at the marking and packaging location (300, 300A, 300B) and comprises information about which current item (10) is contained in what "parent" larger containing item (10), and which "child" item(s) are contained in said current item (10).

FIG. 5 illustrates an embodiment of the invention, storing a record (110) of the hierarchical code relation (304, 404) of current item (10) (for basic type items (10'), carton type item (10"), for pallet type item (10'''), etc., in a database. This would include the use of an index file.

FIG. 6 illustrates an embodiment of the invention with storing of a record (110) of the hierarchical code relations (304, 404) at separate addresses (112, 112' 112", 112''', 112'''', ... ) for each level of item (10, 10', 10", 10''', 10'''', ... ).

FIG. 7 illustrates an advantageous embodiment of the invention wherein hierarchical code relations (304, 404) and storing of them simplified to address (112)=unique code (30); all items carry same type of unique code marks (30) irrespective of item level (10, 10', 10", 10''', 10'''', ... ), using same type of generalized unique codes (30) universally for all item levels (10).

FIG. 8 illustrates a further advantageous embodiment of the invention wherein the hierarchical code relations (304) or the hierarchical re-packaging code relations (404) are stored at the record address (112) corresponding to the current item's (10) unique code (30), but for which the hierarchical code relations (304, 404) written to the address (112, (30)) omits writing the current code (30) itself, as it is implicit in the address (112 (30)).

FIG. 9 illustrates the above mentioned further embodiment of the invention, updating hierarchical code relations (404) and storing as an appendix to the existing hierarchical code relations (304, 404) within the maximum record size of the record (110). The record (110) will accumulate, during the item's (10) travel from the marking and packaging location (300) through the supply chain up to the owner,
    packaging hierarchical code relations (304),
    first re-packaging hierarchical code relations (404),
    second, third re-packaging hierarchical code relations (404), and so on,
    all the way up to the shop (20) re-packaging (un-packaging) hierarchical code relations (404), and
    to the outside shop registration which we may call the packaging relations (403) of the item (10) in hand of the new owner for a re-packaging hierarchical code relations (404).

FIG. 10 illustrates hierarchical code relations (304, 404) stored in records (110) under the code (30)=address (112) for each code (30) marked item (10) in a data storage location (113). In an embodiment of the invention there is allocated space for each record (110) for each packaged code (30) marked item (10), if the space required through the supply chain may be predicted and also allowed some slack.

FIG. 11 illustrates a hospital example as external supply chain outside shop (20) as an extension of the supply chain from the marking and packaging location (300) to the shop (20).

Components list 0
10   item (10) in general, or
      more specificallly: in increasing hierarchical level:
      item (10') basic sales item (10')
      item (10") carton of basic items (10')
      item (10''') pallet of cartons (10")

| | Components list |
|---|---|
| | item (10'''') shipping container of pallets (10'''), and so on. |
| s | owner restricted services (s), |
| | may comprise activation code (39), etc. |
| 20 | shop (20), sales location (20) |
| 22 | border (22) |
| 23 | entry (21) of shop (20) |
| 24 | exit (24) from shop (20) |
| 30 | unique code (30), dual unique code (30, (31, 32) |
| 30e | encrypted unique code (30e) from code (30) |
| 31 | batch code part (31) of dual unique code (30) |
| 32 | serial code part (32) of dual unique code (30) |
| 33 | status code (33) = "unsold" or "sold" |
| 34 | returned information (34) upon valid |
| | enquiry based on validated |
| | code (30) and status = "sold". |
| 35 | returned free information (38) such as price, number in stock, recommended additional products, etc. |
| 36 | recall status (36) |
| 37 | |
| 38 | |
| 39 | activation code (39) for said item (10) sent to said consumer operated handheld device (60). |
| 50 | consumer database (50) |
| 52 | personal record (52) in consumer database (50), including consumer identity (68). |
| 60 | handheld unit (60) for customer, with portable scanner (66) |
| 61 | position (61) outside or inside of said border (22) |
| 62 | position indicating device (62) |
| 64 | optionoal decryption unit (64) |
| 66 | customer operated portable code scanner (66) |
| 67 | device identity (67) of consumer operable handheld unit (60), associated with consumer identity (68). |
| 68 | consumer identity (68) associated with device identity (67) |
| 70 | system's code scanner (70) |
| 80 | |
| 90 | |
| 91 | code attribution control system (91) |
| 100 | track and trace system (100). |
| 101 | |
| 110 | record (110, 110', 110'', 110''', 110'''', . . .) of |
| 112 | address (112) of record (110), in an embodiment, unique address (112) = unique code (30) |
| 113 | data storage location (113) for records (110) for hierarchical code relations (304, 404) and |
| 300 | marking and packaging location(s) (300, 300A, 300B, . . . , |
| 303 | packaging hierarchy (103) of at least three different packaging levels of items (10, 10', 10'', 10''', 10'''', . . .) (of which an upper and/or lower level may be void), comprising a current package (10, . . .), a containing package (10, 10P, . . .), and one or more contained packages (10, 10c, ,. . ). |
| 304 | extensive notation: |
| | code hierarchy (104) of codes (30, 30', 30, 30', 30, . . . ) relative to a current code (30, 30', 30'', 30''', 30'''', . . . ) (corresponding to said packaging hierarchy (103), comprising the code (30, 30P, 30', 30'', 30''', 30'''', . . .) of the containing package (10, 10P, 10', 10'', 10''', 10'''', . . .), [optionally the code (30, 30', 30'', 30''', 30'''', . . .) of the current package (10, 10', 10'', 10''', 10'''', . . . ), and one or more codes (30, 30C, 30', 30'', 30''', 30'''', . . .) of contained packages (10, 10c, 10', 10''', 10'''', . . .). |
| 304 | shorthand reference numeral notation: |
| | code hierarchy (304) of codes (30) relative to a current code (30) comprising |
| | the code (30, 30P) of the containing package (10, 10P), |
| | [opt. the code (30) of the current package (10),] and |
| | codes (30, 30C) of contained packages (10). |
| 400 | re-packaging location(s) (400, 400A, 400B, . . .) receiving hierarchically packaged items (10) for re-packaging into re-packaged hierarchy(ies) |
| 403 | re-packaged hierarcy (103) of at least three different packaging levels of items (10, 10', 10'', 10''', 10'''', . . .) comprising a current package (10, . . .), a containing package (10, 10P, . . .), and one or more contained packages (10, 10c, . . .). |
| 404 | shorthand reference numeral notation: |
| | code hierarchy (404) of re-packaged codes (30) relative to a current re-packaged code (30) comprising |
| | the code (30, 30P) of the containing package (10, 10P), |
| | [opt. the code (30) of the current package (10), |
| | and codes (30, 30C) of contained packages (10), |

DESCRIPTION OF EMBODIMENTS OF THE INVENTION

The invention is a code attribution control system (91), comprising
- a code resource (105) of unique codes (30), wherein each said code (30) is arranged for being placed or marked openly accessible legible or scannable on one or more sales items (10);
- a track and trace system (100) arranged for tracking and tracing each single item (10) individually in a logistical supply chain (300, 400, 500, 20), and preferably up to at least the first owner,
- wherein the items' (10) unique codes (30) are scanned and/or registered by the track and trace system (100) when the items (10) are received/delivered and supplied to a shop (20), whereby the code (30) of said item (10) is registered in said track and trace system (100) to be stocked by the shop (10),
- wherein said one or more sales items (10) are arranged for being openly and freely displayed and for sale within a physical border (22) of the physical shop (20);
- wherein each said code (30) marked items (10) initially* are allocated a status code (33) attribute as "not sold"; in said attribution control system (91), either when arriving in the shop (20) or earlier, optionally at a marking and packaging location (300);
- wherein, for a consumer in possession of said code (30) marked item (10) and at a position (61) outside said border (22), in order to establish ownership or indication of ownership of said item (10), the consumer scans and registers said code (30) to an attribution control system (91) from said position (61) outside said border (22) of the shop (20).
- Upon receiving the code (30) under the conditions above, said status code (33) attribute is changed to "sold" in said attribution control system (91), and
- ownership of the code (30) marked item (10) is associated to a consumer identity (68) is registered in the control attribute system (91) (please notice that we here consider consumer ownership);
- after which owner restricted services (s) related to said code (30) marked item (10) will be made available to the consumer.

FIG. 1 is an overview of the basic features related to the invention, but also an illustration of the invention, which will be described below. In FIG. 1 we have illustrated an outline plan of a shop (20) such as a building, with walls representing a border (22) of the shop (20), and having an entry (23) and an exit (24). The term shop (20) is a somewhat popular term of what could rather be called a sales location (20), a location, premises, marketplace or trading area where a physical item for sale is stored, offered for sale or displayed, or otherwise generally arranged for trading activities, and where a sale, trade, transfer, or picking/delivery up of the physical item takes place. Items (10) are displayed for sale within the border (22). The border (22) defines an enveloping control area wherein there is an inside and an outside that are distinguished. The geometrical shape and, geographical or otherwise corner positions of the polygonal arrangement of the border (22) is according to the discretion of the implementing party. Several such enveloping control areas may be controlled. Each item (10) is identified by a unique code (30). One or more customer operated portable/handheld units (60) with a customer operated code scanner (66) are available to the customers for scanning reading the unique code (10) marks on the items (10). Usually, when a consumer purchases an item (10) when located within the border (22) of the shop (20), he will normally receive a printed receipt at the cash register (75). Alternatively, when a consumer purchases an item (10) when located within the border (22) of the shop (20), he may also receive an electronic receipt if the consumer is registered in a consumer database (50) operated by the shop and operated e.g. in an app. A basic feature of the present invention is to consider the holder of the uniquely coded (30) item (10) outside the border (22) of the shop (20), as the proprietor.

The customer operable handheld device (60) may be implemented as a mobile phone with an app dedicated to communicate with an app server (92) connected to a central data register (90) with a code attribution control system (91) and a track and trace system (100). The current invention comprises a track and trace system (100) which able to track a unique code (30) individually. Advantageous embodiments of the track and trace system are described herein. The mobile phone will then under ordinary conditions be the customer's own mobile.

FIG. 2 illustrates an alternative embodiment of the invention, wherein the border (22) may be not materially present absent, but still defined, or divided into several connected or not interconnected sub-areas, or even "void" areas defining "outside" the border (22), such as an otherwise unrelated cafe arranged as an "island" within a shop. To define a position outside the shop, but within such a cafe "island", may be determined using WiFi positioning or electrical wire delimiting of such an internal border (22).

The invention is illustrated in FIGS. 1 and 2, and is code attribution control system, comprising unique codes (30). One of the purposes of the code attribution control systems is to control and manage ownership of unique coded items that can be openly and freely displayed in public shopping areas before a sales transaction, as well as when outside the shop areas whereby an owner might be assumed.

Each said code (30) is arranged or marked openly legible or scannable on a sales item (10), wherein one or more of said sales items (10) is openly and freely displayed and for sale within a physical border (22) of a physical shop (20).

Each said item (10) is initially allocated a status code (33) attribute as "not sold" in the attribution control system (91). There are several other ways of specifically expressing the status code (33) attribute as "not sold", e.g. "for sale", "still for sale", "in stock", or similar, having the same meaning that an end user has not taken over ownership of the marked physical item.

For a consumer to establish ownership or indication of ownership of said item (10), the consumer scans and registers said code (30) of the item (10), when he has brought the item (10) outside the border (22) of the shop (20), or is otherwise in possession of the item (10) outside the shop. When having scanned the code (30), the status code (33) attribute is changed to "sold" in the attribution control system (91),
- after which owner restricted services related to the item (10) will be made available to the consumer. Those are the core features of the invention.

Thus a first condition for establishing the ownership of the item (20), is that the item (20) is actually outside the shop (20), i.e. outside the border (22) of a controlled area of the shop (20), and that the holder of the item (10) scans the code (30). (The system assumes that the holder of the item (10) is the owner, when the item (10) is outside the border (22) of the shop. Of course, the item (10) may be stolen or otherwise illegitimately obtained or brought outside the border (22), but that is legal matter not addressed here), hence the ownership in reality is indicated, such as would be the case when stolen.) The invention addresses the problem of avoiding scanning the code in the shop, when not having become the owner, to avoid wrong ownership of the item (10), and denying a non-owner services and benefits related to the ownership of the item (10).

In an embodiment of the invention, the unique code (30) marked items (10) displayed for sale in the shop (10) are registered in a track and trace system (100), please see FIGS. 3 and 4. An advantageous function made possible by using a unique code (30) on an item (10) is aggregated track and trace. Aggregated track and trace is a very granular system providing extensive logistics and circumstantial information from unique code (30) marked pallet items (10) and code (30) marked transportation container items (10) down to the single purchasable code (30) marked item (10), in other words, the items at two, preferably three or more, different packaging hierarchy levels are all code (30) marked items (10), preferably marked using codes (30) generated in the same code generator (105).

When goods in the form of unique code (30) marked items (10) are received by a shop managed by the shop operator managed by the track and trace, the shop scans incoming items (30), please see FIG. 3, upper right part) as instructed and determined by the track and trace protocol. A unique code (30) marked pallet item (30) with for instance apple juice cartons will be registered as a pallet with apple juice and 600 cartons, also unique code (30) marked items (10) on that pallet item (30) for the shop receiving it. The pallet is thus at a higher packaging level than the cartons. Essentially, since each code (30) marked carton item (10) is associated with the pallet item (30), the track and trace system now has registered which shop (20) (which location) has which unique code (30) marked items (10) in the supply chain. Further the track and trace system has an inventory (stock keeping) of items that is linked to and managed by the track and trace system.

One of the features of a track and trace system is to gather data on many supply chain aspects, for instance logistics and consumer behaviour patterns. This type of information might, in full or in part, might be shared with consumers.

However, if ownership outside the shop is established as described by the current invention (even without using a track and trace system as below), the benefits of obtaining ownership data is on either the shop operator, brand owner, company or possibly on a regional level, which is valuable to one or more of the benefitted parties alone, but possibly not fully utilizable for several of the involved parties combined. Thus, in an embodiment of the invention further advantages are obtained using a track and trace system.

By using the unique code (30) of the uniquely coded product item (10) it will as explained above provide additional information that can be used in a sales situation. Advantageously, using a track and trace system which is arranged for registering supporting the establishment of the ownership, will due to the track and trace information also identify from which shop (20) the code (30) marked item (10) was stocked and sold from, and preferably also the shop operator associated with the shop (20) A sale of an uniquely coded (30) item (10) according to invention linked to a track and trace system opens new possibilities for both the manufacturer, the brand owner and the shop operator, and even these parties can make programs in cooperation since they can share information about the supply chain logistics, sold items and the consumers buying them.

This gives the sales operator, it being in this context the shop operator and/or the brand owner, alone or together, more opportunities to fine tune the value and benefits that can be released with the sale as per the current invention.

In an embodiment of the invention, an advantageous information arises by also linking the uniquely marked (30) sales item (10) to a track and trace system (100) when managing the attribute control system, is that when a sale is established by a consumer outside a shop (20), not only is that easy to do for the consumer and the shop, but in addition it can be recorded from which sale shop and outlet the consumer sourced/obtained the item.

The operator might want to enforce additional rules about when it is possible or allowed to transfer the ownership of an item in addition to the limitation of the unique code (30) marked item (10) satisfies the condition of being outside the border (22) of the shop (20) when scanning the code (30), as described by the core invention. For instance, according to an embodiment of the invention, such an additional condition can be that the track and trace system actually has registered the marked item to have been received, registered and stocked by a shop or from a given list of shops. In other words the ownership cannot be transferred to the consumer if the track and trace system, communicating with the code attribution control system determines that a shop stocking the item is not registered. If not, that would indicate that the item possibly has been stolen during transport in the supply chain, or maybe it has reached the wrong destination, say another state in the US than planned. In any case it means that no shop has it in stock for sale. However, this limitation may be undesired, and in other embodiments one simply trusts the holder of the item (10) to be the proper owner.

In an embodiment of the invention, the consumer uses a portable device (60) with a customer operated code scanner (66) scanning said code (30), and the portable device (60) communicates the scanned code (30) to the attribution control system (91).

Of course, the ownership of the item (10) may be established inside the shop (20), i.e. within the border (22). The consumer and the sales item (10) may in this alternative be within the border (22) of the controlled area of the shop (20) and having registered a receipt from said shop (20) for said item (10). Thus this may be the second condition for establishing the ownership, that the consumer has a receipt, if still inside the shop.

In practice, we need to establish conditions for being outside the border (22) of the shop (20). In an embodiment of the invention, the consumer is scanning and registering the code (30) outside the border (22) when receiving a position (61) given by a position indicating device (62), such as a GPS (62) or similar, which position (61) is calculated to be outside of the control border (22). Other means (62) to indicate a position (61) with sufficient accuracy, which means is accepted by the shop (20) owner. Position may also be determined using other technologies, tools, or methods, such as Wifi-assisted positioning.

The shop border (22) according to invention might be a virtual or digital representation of a physical border of the shop (22). It may in an embodiment of the invention be a polygon represented by the coordinates of its corners given by the corners coordinates, or it may in yet another embodiment be a radial distance from a point representing the center of the shop or the exhibition point, to ensure a position (61) truly outside the shop or marketplace of display.

Position

In an embodiment of the invention, the portable device (60) is implemented as a mobile phone or a computer or similar device of some kind. In an embodiment of the invention the portable device (60 is provided with a position receiver (62) such as a GPS (61). The portable device (60) is provided with a customer operated code scanner (66) such as a mobile camera, any type of bar code code scanner, usually implemented as a camera app, or a contactless code scanner such as an RFID/near-field communication scanner.

Initial Comments on the Invention

The present invention relies on mutual trust. The ownership of the code (30) marked item (30) is made directly by registration of the consumer identity (68) in the code attribution system (91) which will change the status code (33) to "sold", and assign the ownership of the item (10) to the consumer identity (68). It is assumed by default that the holder, the consumer with consumer identity (68), is the proper owner, without further proof of purchase, receipt, or scanning of the code (30) in a cash register in the shop (20), but simply by the consumer, the holder, scanning the unique code (30) when having the item (10) outside the shop. In an embodiment of the invention the code attribution system (91) may have a check function for checking whether a sales receipt has been issued when it registers the status code (33) as "sold". Theft of the code (30) marked item (10), which is another problem, could then be revealed by the system (91). One thus has trust to a significant proportion of the holders of items (10), with regard to first buyer or second hand buyers ownership. In an embodiment of the invention, a current holder having taken over the code (30) marked item (10) from the first registered owner, could simply scan and register the unique code (30) of the item (10) and register himself as the owner of the item (10), inheriting the associated owner restricted services (s). This simplifies the registration process of the item (10) and allows the system to consider the holder as the proper owner, which is an advantage with regard to informer transfer of ownership, which benefits the brand owner and maintains the commercial value of the product: the consumer/holder will know that he may forward the item (10) to another holder which registers the ownership of the item (10) to himself, including the benefits and services (s) associated with the item (10). A recall message may if necessary be issued to the current holder in order to ascertain the recall process without delay, which may be important if the reason for recall is severe, such as contaminated item (10), discovered undesired by-effect of item (10), malfunctioning item (10) such as risk of brake failure, fire hazard of mobile phone, etc.

Device (60) Identity (67) Associated with Owner Identity (68) of Mobile (60)

In an embodiment of the code attribution control system (91) of the invention, the consumer identity (68) such as name or client number or a unique number such as a social security number, is associated to a device identity (67), such as mobile number, of a customer portable device (60) and is registered in said code attribution system (91).

The first consumer with consumer identity (68) registering the unique code (30) marked item (10) in the code attribution system (91) is considered as the holder and thus the proper owner of the item (10).

(Consumer) Owner Identity (68) Registered in Track & Trace System (100)

In an embodiment of the code attribution control system (91) of the invention, the consumer owner identity (68) having consumer ownership of the code (30) marked item (10) is registered in said track and trace system (100). This may be registered in a re-packaging location (400) by entry with a re-packaging hierarchical code relation (404), or in the shop (20) or outside the shop border (22) please see FIG. 9. Please also notice that an item may change owner during the track and trace history, and such entries of owner of each specific item (10) may be registered as part of the packaging or re-packaging hierarchical code relations (304, 404) for a current item (10). Such change of ownership may occur several times between the marking and packaging location (300) and the shop (20). Further, items of different item levels may be assigned different owners.

Register "not Sold" at Marking and Packaging Location (300)

According to an embodiment of the invention, In the code attribution control system (91), said item (10) is initially is allocated a status code (33) attribute as "not sold" in said attribution control system (91), already when said item (10) is marked at a marking and packaging location (300) before being transported from the manufacturing location (200) and packaging/marking location (300) to the shop (20). This may be conducted when the unique code (30) is registered as being applied to a marked (30) physical item (10).

Register "not Sold" when Item (10) Arrives in Shop (20)

In another embodiment of the invention, the code marked physical item (10) is allocated the status code (33) "not sold" when the unique code (30) marked physical item (10) is registered by the track and trace system (100) as arrived and being on stock or displayed for sale in the shop (20).

Customer Operable Portable Device with Code Scanner (66).

In an embodiment of the invention, in the code attribution control system (91) the consumer uses a portable device (60) with a customer operated code scanner (66) scanning said code (30), and said consumer operable portable device (60) communicates said scanned code (30) to said attribution control system (91). In an embodiment the consumer operable portable device (60) is a mobile telephone which has software and hardware enabled to scan a code (30).

(Supplementary Condition "Inside")

In a further embodiment of the invention, as a supplement to the condition of being outside the border (22) of the shop for allowing assignment of consumer ownership, the consumer and the sales item (10) may be within the border (22) of the controlled area of the shop (20) and the consumer having registered a purchase receipt from said shop (20) for said item (10), which may override the "outside the shop" condition. This would allow the user to remain in the shop (20) for registering his ownership and receiving the benefits(s) when still within the shop, for e.g. allowing the consumer to purchase associated items (10) or further items (10) when already being in the shop.

Specifying Logistical Supply Chain to Comprise Mark&Pack Location (300), Re-Packaging Loc (400), Etc.

In an embodiment of the invention, said logistical supply chain (300, 400, 500, 20) comprises one or more of
- a marking and packaging location (300, 300A, 300B, . . . ), such as factory packaging line,
- a re-packaging location (400, 400A, 400B, . . . ), such as a spedition centre, export or import harbour, a customs station, etc.,
- a tracking location (500) [such as customs site, harbour, airport, etc]
- said shop (20), and optionally a first consumer/owner and further optionally further subsequent consumers/owners.

Condition for Position (61) Outside Border (22)

In an embodiment of the invention, the consumer and the item (10), while scanning and registering the code (30), is considered as outside said border (22) when having or receiving a position (61) given by a position indicating device (62), such as a GPS (62) in or connected to said portable device (60) with said customer operable code scanner (66), and said position is deemed or calculated to be outside of the control border (22).

In a further embodiment of the invention, an additional condition is that in addition to satisfying the first condition that the marked (30) item (10) is scanned from a position outside the shop (20), it shall also be at a position less than a given distance (measured in metres or in travel time) from a shop (20) wherein the marked (30) item (10) was registered as displayed or stocked.

Mobile as Consumer Operated Handheld Unit (60) with Code Scanner (66)

According to an embodiment of the invention, in the code attribution control system, said customer operable portable device (60) is a mobile phone or a handheld computer, with said customer operated code scanner (66) being such as a camera which is very common for mobile phones and "tablets", any type of bar code code scanner, or a contactless code scanner such as an RFID/near-field communication scanner.

Status Code (33) "Sold" and Owner Restricted Services (s) Sent to Consumer Operated Portable Device (60)

According to an embodiment of the invention, In the code attribution control system, said status code (33) attribute is changed to "sold" in said attribution control system (91), and upon said owner restricted services (s) related to said item (10) is made available to the consumer, said status code (33) attribute="sold" is communicated and indicating successful ownership registered as "sold to consumer", or "owned by consumer", or reg. number, or similar) and associated with device identity (67) of said user operable portable device (60) from said attribution control system (91) to said portable device (60), thereby enabling owner restricted services (s) to said consumer operated portable device (60).

Activating Code (39) Sent as Part of Owner Restricted Services (s)

In yet an embodiment of the invention, an activating code (39) is part of said owner restricted services (s), which is
- either sent to said consumer operated portable device (60) communicating with said sold item (10) and sending said activation code (39) for activating said item (10), or
- or directly communicated to said sold item (10), said activation code (39) activating said item (10).

Consumer Identity (68) Registered in Consumer Database (50)

In an embodiment of the invention, the consumer identity (68) is registered in a personal record (52) in a consumer database (50) accessible to said attribution control system (91). In this manner, the purchase of the item (10) may be added to the personal record (52) for subsequent analysis of consumer behaviour and allows recommendations on auxiliary products to be offered to the consumer. In an embodiment of the invention the consumer identity (68) is recorded in the record (110) together with the hierarchical code relation (304, 404), as part of additional information "X" such as location, time, date, status (sold=false/true), recall status, consumer id (68), etc, please see FIG. 10 and FIG. 9.

Virtual Representation of Shop Border (22)

The shop border (22) may be an ordinary wall (22) surrounding the shop (20). But the shop (20) may be in the open or have no material "physical" border, such as if the shop (20) forms an area without strict physical limitations, please see FIG. 2, e.g. vis a vis other shops, e.g. it forms a part of a floor shared with other shops in a large building, but with reasonable clear border (22) around the shop (22). The shop (20) may also be part of an outdoor market with similarly reasonably clear border (22). According to an embodiment of the invention, the shop border (22) is a virtual representation of the geographical extension the shop (20), or a digital representation of a border, material or not, of the shop (22).

Code Generator (105) or Code File (106)

In an embodiment of the invention, there is comprised a source (105) of unique codes (30) or a code generator (105) arranged to generate unique codes (30) arranged in a digital or physical code file (106) of such unique codes (30), and for transferring said codes (30) to said marking and packaging location (300, 300A, 300B, . . . ). In an embodiment of the invention, the source in the form of a code generator (105) may be a third party service providing said unique codes (30) on a file, a physical or a data file (106), arranged for marking the items (10) and for storing the associated unique codes (30) in the track and trace system (100). The unique codes (30) of the marked items (10) are then stored in records (110) in a data storage location (113). The unique codes (30) are provided to the marking and packaging location (300) and printed, written or attached to the items (10), and the mutual arrangement of which items (10) contain other items (10) and are packed in which other items (10) are registered as a packaging hierarchy (303). The number of unique codes (30) required may be on the order of 10 exp 2 or 3 for very small series items (10) to 10 exp 9 or more for very large series of items such as small medicine boxes.

Batch Number, Serial Number in Batch

In an embodiment of the invention, please see FIG. 4, each unique code (30) comprises a first code part (31) and a second code part (32) which is unique under said first code part (31). The first code part (31) may be a unique batch number, the second code part (32) may be a unique serial number in the batch.

Encrypted Codes

In an embodiment of the invention, said code (30) is encrypted to a unique encrypted code (30, 30e) in an encryption unit (124) in said code generator (105). In an embodiment of the invention the code attribution system has an encryption and decryption feature for the codes (30, 30e). In an embodiment the encrypted code (30, 30e) is marked on the item in order for counteracting code counterfeiting, and the code attribution system. said code attribution system (91) or said customer handheld unit (60) with customer operable first code scanner (66) is provided with enabled to decrypt said unique encrypted code (30, 30e). The decryption may also take place in the code attribution system (91) centrally.

Freely Available Information without Owner Rights

According to an embodiment of the invention, said unique code (30) may be scanned using the consumer operated device (60) inside the shop, thus having a position (61) inside the borders (22) of said shop (20), using the consumer operated device (60), by a non-owner, for the potential buyer to communicate said unique code (30) to said central data register (90) or to said track and trace system (100) to obtain both general and item specific information, such as price, requirements for use, recommended accompanying products, or recall status.

Specification of the Track and Trace System (100)

Hierarchical Packaging Relations (303)

In an embodiment of the invention, it is registered on said marking and packaging location (300, 300A, 300B), a hierarchical packaging relation (303), please see FIG. 3 and FIG. 4, for each current unique code (30) marked item (10), wherein said hierarchical packaging relation (303) of a current item (10) comprises
a parent, code (30) marked Item (10) (if present and if code marked) containing
    the current code (30) marked item (10), containing
        one or more child, code (30) marked items (10) if present, contained in said current item (10).

In an embodiment of the invention the packaging relation (303) comprises any level item (10, 10', 10", 10'", 10"", . . . ) using the unique code (30) marks supplied from a common source (105) or file (106) of unique codes (30), Please see FIG. 3.

FIG. 3 illustrates an embodiment of the invention wherein the shop (20) forms part of a track and trace system (100) comprising one or more marking and packaging locations (300, 300A, 300B, . . . ) wherein unmarked items (10) (but usually batch number is known) items (10) are provided with each their unique code (30) are packed in a packaging hierarchy (303), transport routes to one or more re-packaging and logistical distribution locations (400) wherein re-packaging into a re-packaging hierarchy (403) of the code marked (30) items (10) occurs, further transport via tracking locations (500), (tracking locations may occur also between re-packaging locations (400), eventually to a shop (20) wherein the marked (30) item (10) is displayed or otherwise available for sale. The track and trace system (100) directly or indirectly registers and keeps track and trace of each unique marked item (10) throughout, even though only outer level packaging level item (10) need be scanned. The track and trace system (100) also keeps track of the packaging hierarchy (303, 403) which in an embodiment of the invention is associated with a three-level code hierarchy (304, 404) comprising a code (30) for a "parent" item (10), a code (30) for a current item (10), and a code (30) for one or more child items (10).

Establish Hierarchical Packaging Code Relations (304)

According to a further embodiment of the invention, wherein for each current item (10) packaging hierarchical code relations (304) of the current item (10) are established based on said hierarchical packaging relations (303), please see FIG. 4, wherein said packaging hierarchical code relations (304) comprises
a unique code (30) of parent item (10) containing the current item (10) (if none, it is nil)
    the unique code (30) of the current item (10)
        one or more unique codes (30) of child items (10) (if present) contained in said current item (10).

Using Unique Code (30) as Storage Address

According to an embodiment of the invention, wherein said hierarchical code relations (304) is stored as a first part of a record (110) at an address (112) of a data storage (113), said address (112) corresponding to the unique code (30) of said current item (10).

FIG. 4—illustrates an embodiment of the invention wherein hierarchical packaging relations and code relations at several levels, and some related hierarchical code relations at the different levels. Here is shown hierarchical packaging relations (303) between code (30, 30') marked first level items (10'), which are packed into code (30, 30") marked second level items (10"), such as boxes. A number of such boxes, second level items (10") are placed in or on larger third level items (10'") such as pallets, and such pallets, third level items (10'") may be placed in shipping containers which here are called fourth level items (10""). Those hierarchical "physical" (material) packaging relations (303) are registered at the marking and packaging location (300, 300A, 300B) and comprises information about which current item (10) is contained in what "parent" larger containing item (10), and which "child" item(s) are contained in said current item (10). Those packaging relations (303) are converted, for each marked (30, 30', 30", 30'", 30"") item (10, 10', 10", 10'", 10"") into an abstract hierarchical code relation (304) about which the code (30, 30', 30", 30'", 30"") of the current item (10, 10', 10", 10'", 10"") is related/contained in what code (30, 30', 30", 30'", 30"") of "parent" larger containing item (10, 10', 10", 10'", 10""), and which code (30, 30', 30", 30'", 30"") of "child" item(s) (10, 10', 10", 10'", 10"") are contained in/related to the code (30, 30', 30", 30'", 30"") said current item (10, 10', 10", 10'", 10"").

An example of such packaging relations (303) is shown for a carton item (10"), which may be written as follows:
hierarchical packaging relation (303) of current item (10") (carton):
a parent item (10'") (pallet) containing
    a current item (10") (carton), and
        child items (10') (contained base items, first level items (10'))

An associated corresponding hierarchical code relation (404) for the same carton item (10") is illustrated as:
hierarchical code relation (304) of current item (10"):
unique code (30'") of parent item (10'") (pallet) containing
    unique code (30") of current item (10") (carton)
        unique codes (30') of child items (10') (contained base items (10').

A similar set of hierarchical packaging relation (303) and corresponding hierarchical code relations (304) is illustrated for a pallet item (10'").

At the right part of FIG. 4 is illustrated that the packaged items (10) are transported to a re-packaging location (400) wherein items (10) from different packaging locations (300, 300A, 300B) are opened and some items partially taken out and/or re-packaged with other items from other items or other batches, and new re-packaging hierarchical relations (403) for all items (10) involved. Re-packaging code relations (404) arise. In the lower right part of FIG. 4 is shown an item (10) having been transported from a latest re-packaging location (400) to a shop (20), which may be treated in the present system as a last re-packaging location (400) because under normal circumstances cartons (10") or basic items (10') are unpackaged from their containing items (10) such as pallets (10'") or cartons (10') for being displayed for sale in the shop (20).

Advantageously, being in possession of the packaging hierarchical code relations (304) (and further advantageously all the re-packaging (and un-packaging) code relations (404)) allows the reconstruction of a complete packaging tree for all packaged code (30) marked items (10) (and later, for all re-packaged code (30) marked items (10); the logistical operator may scan a code (30) at any packaging level and look up which items (10) are contained in the currently scanned item. One may omit establishing an original packaging relation tree, and one does not need to maintain any packaging relation tree during the logistical supply chain.

FIG. 5 illustrates an embodiment of the invention, storing a record (110) of the hierarchical code relation (304, 404) of current item (10) (for basic type items (10'), carton type item (10"), for pallet type item (10'"), etc., in a database. This would include the use of an index file. The use of an index file would require continuously updating the index file and add complexity to the job of tracking and tracing the items (10), so more efficient embodiments of the invention are described below.

FIG. 6 illustrates an embodiment of the invention with storing of a record (110) of the hierarchical code relations (304, 404) at separate addresses (112, 112' 112", 112''', 112'''', . . . ) for each level of item (10, 10', 10", 10''', 10'''', . . . ). Here, the storing is simplified to address (112, 112' 112", 112''', 112'''', . . . )=unique code (30, 30', 30", 30''', 30''''), but still different codes (30, 30', 30", 30''', 30'''') for different item (10, 10' 10".) levels. In this embodiment, there are different data storage locations (111, 111', 111", 111''', 111'''') for records (110, 110', 110", 110''', 110'''') for different levels, and we need a system of keeping track of which item level a record belongs. In the shown example we store a record (110") of the hierarchical code relation (304) (404) of current item (10"), a carton (10") of basic items (10'), at an address an address (112") in a data storage location (111") corresponding to the unique code (30") belonging to current item (10"), one record (110, 110', 110", . . . ) for each different items (10, 10', 10", 10''', 10'''', . . . ) level marked differently.

In an embodiment of the invention, we use one single type of codes (30) common for all item (10, 10', 10", 10''', 10''''). The advantage of the embodiment is that no index required, thus fast lookup of data directly on the address (112) corresponding to the (decrypted) unique code (30). The record (110) address (112) may be organized according to the discretion of the programmer, e.g. by subdividing a disk into a partition corresponding to the batch number, the first part (31) of the unique code (30), and a sector or file in the partition identified by the second part (32) of the unique code (30) of the item (10).

FIG. 7 illustrates an embodiment of the invention wherein hierarchical code relations (304, 404) and storing of them simplified to address (112)=unique code (30); all items carry same type of unique code marks (30) irrespective of item level (10, 10', 10", 10''', 10'''', . . . ), using same type of generalized unique codes (30) universally for all item levels (10). For this embodiment of the invention, a certain advantage is that since the unique code (30) results in a unique address (112), and if we use a further embodiment illustrated in FIG. 9. In FIG. 9 we write all the hierarchical code relations (304, 404) throughout the track and trace history to the same record (110) with start address (112) corresponding to the code (30) of the current item (10).

If Storage Address (112)=Unique Code (30) then not Necessary to Store Unique Code (30) at its Own Address In a further embodiment of the invention, if the storage address (112) corresponds to or is equal to the unique code (30), then it is not really necessary to store the unique code (30) itself at its own address. For each current item (10), a simplified part of said hierarchical code relations (304) of current item (10) are recorded in said record (110), wherein said hierarchical code relations (304) for said current item (10) written to said record (110) comprise the unique code (30) of parent Item (10) containing the current item (10),
      (and not the a unique code (30) of the current item (10) and one or more unique codes (30) of child items (10) contained in said current item (10).

In other words, saving only the parent and child hierarchical code relations (304). This saves storage space and writing and reading time, because the current code (30) of the current item (10) is already known by the address (112)=current code (30).

FIG. 8 illustrates an embodiment of the invention wherein the hierarchical code relations (304) or the hierarchical re-packaging code relations (404) are stored at the record address (112) corresponding to the current item's (10) unique code (30), but for which the hierarchical code relations (304, 404) written to the address (112, (30)) omits writing the current code (30) itself, as it is implicit in the address (112 (30)).

Hierarchical Re-Packaging Relations (403)

Packaging relations were registered at the marking and packaging location (300). At re-packaging locations (400) one may remove an item (10) from its parent item (10), and/or enter one or more new child items (10) into an item (10), Please see FIG. 3 and FIG. 4. On the re-packaging location (400, 400A, 400B) is registered or occurs a change in the packaging relations (303, 403) relative to previous packaging relations. For the packages involved in a re-packaging location (400), i.e. a hierarchical re-packaging relation (403) for each current, unique code (30) marked item (10), said hierarchical re-packaging relation (403) of current item (10) comprises a parent, code (30) marked item (10), if present, containing
   a current, code (30) marked Item (10) further containing
      one or more child, code (30) marked Items (10), if present, contained in said current item (10).

In an embodiment of the invention the re-packaging relation (403) arising at the re-packaging location (400) involves any level items (10, 10', 10", 10''', 10'''', . . . ) using the same unique code (30) marks supplied from a common file (106) of unique codes which were applied at the marking and packaging location (300).

Establish Re-Packaging Hierarchical Code Relations (404)

In a further embodiment of the invention, for each current item (10) involved in hierarchical re-packaging relations (403), re-packaging hierarchical code relations (404) of the current item (10) are established based on said hierarchical re-packaging relations (403), wherein said re-packaging hierarchical code relations (404) comprises a unique code (30) of parent item (10) containing the current item (10)
   a unique code (30) of current item (10)
      one or more unique codes (30) of child items (10) contained in said current item (10).

In other words, the re-packaging hierarchical code relations are established according to the same structure as the packaging hierarchical code relations.

In an embodiment of the invention said hierarchical re-packaging code relations (404) are stored as a subsequent part of the record (110) at the same address (112) in a data storage (113), said address (112) corresponding to the unique code (30) of said current item (30). In an embodiment of the invention, only changes made in the hierarchical re-packaging code relations (404) are written to the record (110), such as by the removal of parent item (10), or the removal or addition of children items (10). In other words, if the storage address (112)=unique code (30) then it is not necessary to store unique code (30) at its own address.

FIG. 9 illustrates the above mentioned further embodiment, updating hierarchical code relations (404) and storing as an appendix to the existing hierarchical code relations (304, 404) within the maximum record size of the record (110). The record (110) will accumulate, during the item's (10) travel from the marking and packaging location (300) through the supply chain up to the owner, packaging hierarchical code relations (304),
   first re-packaging hierarchical code relations (404), second, third re-packaging hierarchical code relations (404), and so on, all the way up to the shop (20) re-packaging (un-packaging) hierarchical code relations (404), and to the outside shop registration which we may call the packaging relations (403) of the item (10) in hand of the new owner for a re-packaging hierarchical code relations (404), wherein "parent" =nil, but child code is "nil" or it contains further child items (10) such as for a multi-pack item (10) with a number of "child" items (10), each having their own code.

In this embodiment, all the hierarchical packaging and re-packaging hierarchical code relations are stored in the same record (110). In other words, that the record (110), as the track and trace process proceeds from packaging and marking location (300) along the re-packaging locations (400) and tracking locations (500), contains the initial hierarchical code relations (304) and all the re-packaging hierarchical code relations (404), all the way up to and including the shop (20) which may be considered as a re-packaging location (400, 20) because the goods are normally unpacked down basic items (10') or carton items (10") and displayed for sale in the shop (20). Further, the record (110) will hold the "outside the shop" re-packaging hierarchical code relations (404).

The operators at the marking and packaging location (300, 300A, 300B, . . . ) will know how the packaging structure will be. With reference to FIG. 4, an example may be that the e.g. 24 first level items (10') of e.g. medicine boxes, are marked and scanned before being put into carton items (10"), said carton items (10") packed in 5 cartons in each layer and 6 heights=30 cartons (10") on a pallet (10'''), and 24 pallets (10''') ("Europallets") fill a 40 ft. shipping container. Then a reasonable maximum number of codes (30) expected for a specific product base item's (10') a hierarchical code relation (304, 404) at any level is parent code level: 1
current code level: 1
child code level: 24.

For the expectable mixing of types of items (10) at re-packaging locations wherein one should expect that containers or pallets are opened for mixing cartons of different origins on pallets, or mixing pallets of different origin in containers, or even mixing of items at lower levels. The number of expected codes for the hierarchies (304, 404] only vary at "child" level, so the operator may set a highest expected number of expectable "children" according to his own discretion, and also the number of expectable re-packaging hierarchical code relations (404) potentially arising. In an embodiment of the invention tracking locations may provide registrations of outer package (10) tracked at the tracing location (500), at container (10'''') level, pallet (10''') level, or carton (10") level; or even at base item (10') level, if the tracing location (500) is a customs station with a full review of the contents of the transport.

In an embodiment of the invention the size allocated for each entry of packaging code relations (304) and re-packaging code relations (404) may be fixed. In another embodiment of the invention the size allocated for each entry (304, 404) may be variable with only changes of parent or changes of children in re-packaging hierarchical code relations (404) being entered, and having a separation mark before each new entry in the record (110), please see FIG. 9.

An advantage of the embodiment of the invention is that the packaging structure is not directly stored in the track and trace system, but it is implicitly available from the hierarchical code relations (304, 404), (also when re-packaging), and the invention allows for a re-arrangement of the packaging structure. I.e. the present invention is very flexible, fast to register, fast to update, and allows change of packaging structure.

A significant advantage of the embodiments shown in FIGS. 7 and 9, or FIGS. 8 and 9, is the fact that the record (110) contains the complete history of current item from packaging to shop: containing items at any time, contained items at any time. The hierarchical code relations thus the packaging and re-packaging relations for each current code marked item may thus be read out of the record (110) just by scanning (or knowing) the unique code, reading the record (110) from start address (112). This is of significant further advantage for the manufacturer in case of a complaint report, a malfunction report, a need for recall based on an item, to trace back in the item's (10) record (112) to try and find similar failed items (10) in order to find the source of the failure, and call back all items from that common point. Such failures may comprise elevated temperature failure, poisonous content failure, illegal ingredient failure, illegal import failure, etc.

The length of the unique codes (30), which may comprise a first code part (31) and a second code part (32), are known before packaging. The record (110) may in an embodiment of the invention be assigned a fixed length of e.g. 4 kB, 8 kB, 16, kB, 32 kB, or whatever record size is considered as sufficient for a largest size of a packaging (304) and re-packaging series of entries (404) is probable, in practice, for the item's path from packaging and marking and up to the shop and further to the customer.

Please notice that under most circumstances only the code (30) of the outer currently visible item (100) is visible for being scanned at a re-packaging location (400). Its contents will of course carry the same child codes (30) inherited from the previous location (300, 400). Thus it is only necessary to enter changes of parent code (30, 30P) or child codes (30, 30C) for re-packaging of an item (10) hierarchical code relations (404). This may significantly reduce the storage need for the track and trace history in a record (110).

Hospital Example as External Supply Chain Outside Sop (20)

Please notice that in an embodiment of the invention, our system is not restricted to one registration of an owner outside the shop (20). In an embodiment of the invention, a second, third, etc. owner may be registered as the item (10) is handed down outside the shop. This may be used e.g. in a hospital which has acquired the goods from a retailer with a shop or store (20), and subsequent new owners (68, 68-901, 68-902, 68-903 . . . ) are registered in the code attribution control system (91) and assigned owner rights (s) as the item (10) is handed down the external supply chain, please see FIG. 11.

As an example, the first owner registered outside the shop (20) is a hospital (900) represented by a hospital main storage (901) which scans the code (30) of the item (10). It may be a pallet (10''') with code 30, 30'''). In the system, the hospital main storage has consumer identity (68, 68-901). The ownership of pallet (10''') with all its contents, code (30") marked cartons (10") and code (30') marked end user items (10') are now are associated to a consumer identity (68) is registered in the control attribute system (91), after which owner restricted services (s) related to said code (30) marked items (10, 10', 10", 10''')) will be made available to the consumer. The re-packaging hierarchical code relations (404), now outside the brand owner controlled supply chain including the store or shop (20), are registered as a further step in the record (110) in the data storage location (113).
Transfer of Ownership for Contained Code (30) Items (10).

The transfer of ownership to a new owner identity (68) to hospital main storage (68-901) of each contained carton item (10") and end user basic item (10') may then easily be conducted in the record (110) in the data storage location (113) of each child code (30, 30C) of the code (30) of the pallet (10'''), as those are linked by the parent codes (30, 30P) or child codes (30, 30C) in each hierarchical code relation (404).

In the hospital main storage (901) having received the pallet item (10'''), the pallet is now unpacked into code (30") marked carton items (10") which are scanned by the main storage (901) scanner device (60) and assigned e.g. the hospital name (68-901) as the owner identity (68). In an embodiment this is done in the track and trace system for all the contained items (10) in the track and trace system (100), as they are registered in the re-packaging relationship (404) as children of the current scanned item code (30).

Subsequently, the items (10) are then transferred to one of the hospital ward storages (902) and the code (30) of the item scanned upon receipt there, and a corresponding re-packaging relation (404) is written together with the updated owner identity (68, 68-902) to the record (110).

In an embodiment of the invention an analogue transfer of identity may take place when an end user such as a nurse (903) with identity (68, 68-903) takes a code (30) marked basic item (30) and scans the code (30) when picking it up from the carton item (10) at the ward storage (902). The new owner identity (68, 68-903) is then written together with the final re-packaging code relationship (404), which could look like this:

Parent code (30, 30P)=nil
   Current code (30)
      child codes 30, 30C)=nil
   owner=nurse (68, 68,903)
   location, time, date, sold=true.

The basic item may be e.g. a medicine dose in a tablet or bottle or syringe package, a protection wear item such as goggles, face mask, protection gloves, etc. A significant advantage is that with local ownership of the item (10) for the end user, in this example a nurse (903) with owner identity (48-903), he will have owner restricted services (s) related to the code (30) of the marked item (10) at hand immediately after scanning and registering the item to his possession. Here he may have the right to view recall status, expiry date, user instructions and warnings, particularly useful if changed and issued for the specific product after manufacture.
(ultimately, the patient receiving the medicine dose may be assigned owner identity (68) when delivered, and registered in the record (110) as a final destination reached for the item (10), if patient right legislation allows doing so. In such case, this part of the record (110) should be reserved access for the hospital and associated staff only.)

With such a system, for new owners/consumers, the consumer/owner identity (68, 68-901, 68-902, 68-903, ... ) such as name is associated to a device identity (67, 67-901, 67-902, 67-903, ... ) such as mobile number of a customer portable device (60) and is registered in said code attribution system (91). As described, the consumer identity (68, 68-901,68-902,68-903, ... ) having ownership of the code (30) marked item (10) is registered in said track and trace system (100) as described above.

Attribute Status Transfer Back to Owner

In an embodiment of the invention, whereafter the status code (33) attribute has been changed to "sold" in the attribution control system (91), and upon said owner restricted services related to the item (10) is made available to the consumer, the status code (33) attribute="sold" is communicated from the attribution control system (91) to the portable device (60). The attribute="sold" indicates successful ownership registered as "sold to consumer", or "owned by consumer", "owned by holder", "bought", or a registration number, or similar. Now the holder acquires the rights to the item (10) such as the above mentioned
   discount coupon codes,
   a guarantee certificate for the bought item,
   accessing user instructions for the bought item,
   participation in general loyalty schemes and programs,
     and the like.

Attribute Status Transfer Back to Item

In an embodiment of the invention, the attribute status is transferred straight to the item (10) instead of the owner. After the status code (33) attribute is changed to "sold" in the attribution control system (91), and upon the owner restricted services related to the item (10) are made available to the consumer, the status code (33) attribute="sold" is communicated from the attribution control system (91), to the portable device (60), e.g. via a mobile line, and the portable device (60) communicates with the sold item (10), e.g. via a Bluetooth or Wifi line, and sends an activation code (39) activating the item (10). In another, more direct alternative, the attribution control system (91) communicates with the sold item (10) and sends an activation code (39) activating said item (10). In such an embodiment, the item (10) must be enabled for communicating with the attribution control system directly.

The term "activation code" comprises any kind of required token for enabling access of a device, or activating the device.

A practical use for the above embodiment is in cases where the item (10) is a motorized vehicle, a computer, a toy, which requires an activation code (39) to start.

In an embodiment of the invention, the consumer is registered with a personal record (52) in a consumer database (50) accessible to said attribution control system (91).

Having a value linked to a uniquely coded items is a type a variant of a reward and incentive program. It has been a common practice that in most cases it is the shop operator that has been managing such reward and incentive programs. A typical and very well known example of such is a "Buy three and get one for free". However in some cases a program is a collaboration between the shop operator and the brand owner. These type of programs have been run with or without the use of unique item coding of the items.

A new practice and new opportunity is created with the present innovation that it makes it it possible for the brand owner to alone and independently of the shop operators to offer enhanced services and benefits directly to the consumer on their own products. As in the past the brand owner, at least in practice, have been much dependent to collaborate with distributors and shop operators in order to efficiently run incentive programs. They can now avoid the need for the "middle man" when running such incentive programs because they can now operate such a incentive program, using the present innovation without the need for any shop operated systems or they labor, consent or any particular type of cooperation. Operating an item attribution system enables the brand owner to even differentiate the value the code based on the shop operator or even single shop if using a track and trace system. So if the consumer buys at the supermarket chain A, the consumer might be rewarded less than if buying a similar item at the brand owners own supermarket chain B. A track and trace system would enable to know and identify from which the sales point or shop operator in advance of the consumer scanning the item.

Further, a smaller shop operator or any operator, might be running such programs much easier if they collaborate with the brand if they decide to be the operator of the item attribution system.

An additional aspect of the present invention is, that when outside the shop border (22), the holder of the product is considered as the owner of the product, if he just scans the code and communicates with the system. The system requires that the system owner trusts that the beholder of the item is the rightful owner of the item. Theft is a calculated risk in the system, and is handled elsewhere. The invention helps conserve the brand value and value of use of the product for the product holder, and assures a simple maintenance of (for the original purchaser), or transfer of (for the used-item-buyer or inheritor in possession of of a used product) services and benefits for the product, such as updates, guarantees, spare part availability etc.

The central data register (90) may in an embodiment of the invention comprise a customer database (50) containing records (52) about identified buyer:

name, customer identity (68), mobile number, address, gender, age, size,
income, family relations, education level, position,
contact information,
buying preferences, purchase history.

Code Generator

In an embodiment of the invention the system comprises a code generator (105) arranged to generate two or more unique codes (30). In an embodiment the code generator (105) is arranged to generate unique codes (30) arranged in a digital or physical code file (122) of two or more such unique codes (30). The code generator (105) advantageously generates the codes (30) in advance of the items (10) arrive at the packaging and marking location (300, 300A, 300B), the file (122) with the unique codes (30) being transferred to a marking or labelling machine forming part of the packaging and marking location.

In an embodiment of the invention the code generator (105) may be a third party service providing said unique codes (30) on the file (122), physical or a data file, for marking the items (10).

Registering Packaging

In an embodiment of the invention the codes are registered as they are packaged in a packaging file which is converted to a hierarchical packaging code relation (304) for being transferred to the track and trace system (100).

Batch and Serial Number of Code

In an embodiment of the invention each such unique code (30) comprises a first code part (31) and a second code part (32) which is unique under said first code part (31).

Encryption/Decryption

In an embodiment of the The code attribution control system of any of the preceding claims, wherein said code (30) is encrypted to a unique encrypted code (30, 3x) in an encryption unit (124) in said code generator (105).

Short-Range Readable Encrypted Code Mark Label

In an embodiment of the invention, each code (30) is arranged placed on an outside surface of said sales item (10), and may be visually read, optically scanned or otherwise short-range readable. With short range readable, one must consider the code (30) is not possible to read at a distance such as from the outside of the shop (20), from the outside of said physical border (22) when within said physical border (22), if the shop (20) has a border (22). If the shop is an open market, the encrypted code (35) must not be legible from outside of the market. In practice, in an embodiment of the invention, the code (30) arranged as an encrypted text, a bar code, a QR code, or similar. (such as in an RFID).

In an embodiment of the invention, the returned information (34) related to said unique code (30), comprises the status code (33)="sold", or an exit key code, a transport order, a startup key code, user instructions, guarantee, sales contract, for said item (10), to said handheld device (60) and/or to another unit desired by the holder of the handheld device (60).

Further Information 38 on Price, Number of Items

In an embodiment of the invention, some returned free information (38) related to the unique code (30) may, if not status code="sold", still be conveyed back to the portable/handheld device (60), such as the price of the item (10), the number of corresponding items (10) available in the shop (20), either displayed or in store.

Pay on Location

In an embodiment of the invention the handheld device (60) may then negotiate and pay for the item (10) directly or indirectly with a cash register (75) which further allows for porting the item (10) through a code scanner (70) of a cash register (75) or directly out of the shop (20) and otherwise allows the user of the handheld device (60) to the decrypted code (30), which is an important purpose of to the user.

The invention claimed is:

1. A code attribution control system, comprising
   a code resource of unique codes, wherein each said code is arranged for being placed or marked openly accessible legible or scannable on one or more sales items; and
   a track and trace system arranged for tracking and tracing each single item individually in a logistical supply chain,
   wherein the items' codes are scanned and/or registered by the track and trace system when the items are received/delivered and supplied to a shop, whereby the code of said item is registered in said track and trace system to be stocked by the shop,
   wherein said one or more sales items are arranged for being openly and freely displayed and for sale within a physical border of the physical shop,
   wherein each said code marked items initially are allocated a status code attribute as "not sold" in said attribution control system,
   wherein, for a consumer in possession of said code marked item and at a position outside said border, to establish ownership or indication of ownership of said item, the consumer scans and registers said code to an attribution control system from said position outside said border of the shop,
   whereby said status code attribute is changed to "sold" in said attribution control system, and
   whereby ownership of the code marked item is associated to a consumer identity is registered in the control attribute system, after which owner restricted services related to said code marked item will be made available to the consumer.

2. The code attribution control system of claim 1, wherein the consumer identity is associated to a device identity of a customer portable device and is registered in said code attribution system.

3. The code attribution control system of claim 2, wherein the consumer identity having ownership of the code marked item is registered in said track and trace system.

4. The code attribution control system of claim 2, whereafter said status code attribute is changed to "sold" in said attribution control system, and upon said owner restricted services related to said item is made available to the consumer, said status code attribute="sold" is communicated indicating successful ownership registered as "sold to consumer", or "owned by consumer", or reg. number and associated with device identity of said user operable portable device from said attribution control system to said portable device, thereby enabling owner restricted services to said consumer operated portable device.

5. The code attribution control system of claim 4, wherein an activating code is part of said owner restricted services, either to said consumer operated portable device communicating with said sold item and sending said activation code for activating said item, or directly communicated to said sold item, said activation code activating said item.

6. The code attribution control system of claim 5, wherein said consumer identity is registered in a personal record in a consumer database accessible to said attribution control system.

7. The code attribution control system of claim 1, wherein said item initially is allocated a status code attribute as "not sold" in said attribution control system, already when said item is marked at a marking and packaging location before being transported from the manufacturing location and packaging/marking location to the shop.

8. The code attribution control system of claim 1, wherein said code marked physical item is allocated the status code "not sold" when the unique code marked physical item is registered by the track and trace system as being on stock or displayed for sale in the shop.

9. The code attribution control system of claim 1, wherein the consumer uses a portable device with a customer operated code scanner scanning said code, and said consumer operable portable device communicates said scanned code to said attribution control system.

10. The code attribution control system of claim 1, wherein said logistical supply chain comprises one or more of:
a marking and packaging location;
a re-packaging location;
a tracking location; and
said shop.

11. The code attribution control system of claim 1, wherein the consumer, while scanning and registering the code, is considered as outside said border when receiving a position given by a position indicating device in or connected to said portable device with said customer operable code scanner, and said position is deemed or calculated to be outside of the control border.

12. The code attribution control system of claim 11 wherein said customer operable portable device is a mobile phone or a computer, with said customer operated code scanner being a camera, any type of bar code code scanner, or a contactless code scanner including an RFID/near-field communication scanner.

13. The code attribution control system of claim 11, wherein said shop border is a virtual representation of the geographical extension the shop, or a digital representation of a border, material or not, of the shop.

14. The code attribution control system of claim 1, comprising a source of unique codes or a code generator arranged to generate unique codes arranged in a digital or physical code file of such unique codes, and for transferring said codes to said marking and packaging location.

15. The code attribution control system of claim 14, wherein each unique code comprises a first code part and a second code part which is unique under said first code part.

16. The code attribution control system of claim 15, wherein said code is encrypted to a unique encrypted code in an encryption unit in said code generator.

17. The code attribution control system of claim 15, wherein on said marking and packaging location is registered a hierarchical packaging relation for each current unique code marked item, and
wherein said hierarchical packaging relation of current item comprises a parent, code marked item, if present and containing the current code marked item, containing one or more child, code marked items, if present and contained in said current item.

18. The code attribution control system of claim 17, wherein for each current item hierarchical code relations of current item are established based on said hierarchical packaging relations,
wherein said packaging hierarchical code relations comprises a unique code of parent item containing the current item, and a unique code of current item, and one or more unique codes of child items contained in said current item.

19. The code attribution system of claim 18, wherein said hierarchical code relations is stored as a first part of a record at an address of a data storage, said address corresponding to the unique code of said current item.

20. The code attribution control system of claim 19, wherein for each current item a simplified part of said hierarchical code relations of current item are recorded in said record, and
wherein said hierarchical code relations for said current item written to said record comprise a unique code of parent item containing the current item, and one or more unique codes of child items contained in said current item.

21. The code attribution control system of claim 17, wherein on a re-packaging location is registered or occurs a change in the packaging relations relative to previous packaging relations, i.e. a hierarchical re-packaging relation for each current, unique code marked item, and
wherein said hierarchical re-packaging relation of current item comprises a parent, code marked item, if present, containing a current, code marked item further containing one or more child, code marked items, if present, contained in said current item.

22. The code attribution control system of claim 21, wherein for each current item re-packaging hierarchical code relations of current item are established based on said hierarchical re-packaging relations, and
wherein said re-packaging hierarchical code relations comprises a unique code of parent item containing the current item, a unique code of current item, and one or more unique codes of child items contained in said current item.

23. The code attribution system of claim 22, wherein said hierarchical re-packaging code relations are stored as a subsequent part of the record at the same address in a data storage said address corresponding to the unique code of said current item.

24. The code attribution control system of claim 23, wherein for each current item a simplified part of said hierarchical re-packaging code relations of current item are added to the record, and wherein said re-packaging hierarchical code relations for said current item added to said record comprise a unique code of parent item containing the current item, and one or more unique codes of child items contained in said current item.

25. The code attribution control system of claim 24, wherein when or before establishing said record at said address the first time said hierarchical code relations are written to said record, reserving/allocating space for said hierarchical packaging code relations and a number of re-packaging hierarchical code-relations considered sufficient for a largest reasonable probable size and number of said hierarchical packaging and re-packaging code relations related to the nature of said items and their packaging structure of said items.

26. The code attribution control system of claim 14, wherein said unique code may be scanned in the shop, thus having a position inside the borders of said shop, using a consumer operated device, by non-owners, for the potential buyer to communicate said unique code to said central data register to obtain general information about said item or to said track and trace system to obtain item specific information, including price, requirements for use, recommended compatible products, or recall status.

* * * * *